United States Patent
Robinson (10) Patent No.: US 10,036,448 B1
(45) Date of Patent: Jul. 31, 2018

(54) ROPE TIE AND METHOD OF TYING

(71) Applicant: William G. Robinson, Wayzata, MN (US)

(72) Inventor: William G. Robinson, Wayzata, MN (US)

(*) Notice: Subject to any disclaimer, the term of this patent is extended or adjusted under 35 U.S.C. 154(b) by 0 days.

(21) Appl. No.: 15/041,936

(22) Filed: Feb. 11, 2016

Related U.S. Application Data (60) Provisional application No. 62/116,026, filed on Feb. 13, 2015.

(51) Int. Cl.
| | |
|---|---|
| *B65H 69/00* | (2006.01) |
| *F16G 11/00* | (2006.01) |
| *F16G 11/14* | (2006.01) |
| *A01K 1/04* | (2006.01) |
| *A01K 1/06* | (2006.01) |
| *B63B 21/20* | (2006.01) |

(52) U.S. Cl.
CPC ............ *F16G 11/14* (2013.01); *A01K 1/04* (2013.01); *A01K 1/06* (2013.01); *B63B 21/20* (2013.01); *B65H 69/00* (2013.01); *F16G 11/00* (2013.01)

(58) Field of Classification Search
CPC ......... B65H 69/00; F16G 11/00; F16G 11/02; F16G 11/08; F16G 11/10
USPC ....... 24/16 R, 115 R, 132 R, 134 L; 289/1.5, 289/2, 13; 294/82.14
See application file for complete search history.

(56) References Cited

U.S. PATENT DOCUMENTS

| | | | | |
|---|---|---|---|---|
| 1,074,736 | A * | 10/1913 | Noll | D06F 53/00 24/133 |
| 1,496,568 | A * | 6/1924 | Vanderdonck | D06F 53/04 24/134 L |
| 1,969,026 | A * | 8/1934 | Morris | D06F 53/00 24/133 |
| 4,005,509 | A * | 2/1977 | Verdina | A62B 35/04 24/133 |
| 5,408,729 | A * | 4/1995 | Schwartz | F16G 11/14 24/132 WL |
| 5,729,872 | A | 3/1998 | Ginocchio | |
| 5,816,636 | A * | 10/1998 | Gibson | B66C 21/04 294/75 |
| 6,101,684 | A | 8/2000 | Ginocchio | |
| 7,752,719 | B2 * | 7/2010 | Howard | B60P 7/0823 24/132 AA |
| 8,801,062 | B2 * | 8/2014 | Mansfield | B66C 1/12 24/132 WL |
| 8,850,669 | B1 * | 10/2014 | Klein | F16L 3/1075 24/132 WL |

* cited by examiner

*Primary Examiner* — David Parsley
(74) *Attorney, Agent, or Firm* — Richard John Bartz (57) ABSTRACT

A hand-held rope tie is operable to releasably hold two side-by-side portions of a rope. Pivotally connected arm members accommodate and hold the rope portions with a selected clamping pressure. The clamping pressure can be adjusted to create drag or resistance on the rope pulled through the arm members during horse pull-backs to relieve horse panic. Rope tie is also adjustable to tightly grip the rope without slippage of the rope through the arms when desired.

4 Claims, 8 Drawing Sheets

ROPE TIE AND METHOD OF TYING

CROSS REFERENCE TO RELATED APPLICATION

This application claims the priority of U.S. Application Ser. No. 62/116,026 filed Feb. 13, 2015.

FIELD OF THE INVENTION

The technology of the invention relates to rope and line ties and methods of tying ropes and lines.

BACKGROUND OF THE INVENTION

Horse owners love their horses and want to keep them safe, comfortable and happy. Any time a horse is tied there is a risk that the horse may spook and pull back. If the horse is tied hard and fast with a knot, and cannot move its feet, it could lead to a full force panic that could injure the horse and persons nearby, and result in substantial property damage. Generally, allowing the horse to take a few backward steps will relieve panic and avoid a pull back wreck.

Further, there is a need for boaters who for whatever reasons do not like to tie a knot in lines used when docking boats. Docking a boat can prove challenging in low-light and crowded conditions. Tying up a boat can be difficult for a boat operator because of waves, water currents and wind conditions and typically needs to be done as quickly as possible to avoid damage to the boat and dock.

SUMMARY OF THE INVENTION

The rope tie of the invention has pivotally connected arms adapted to swing inwardly toward each other and wrap around two side-by-side portions of a rope that come together after being looped around a suitable tie site. Resistance is regulated by adjusting the position of the arms relative to the portions of the rope and maintaining the selected position. This adjustment allows a horse to take a few steps backward and relieve the panic of the horse while remaining position. This adjustment allows a horse to take a few steps backward and relieve the panic of the horse while remaining tied to the tie site. Adjustment can also be made to prevent movement of the rope through the rope tie thereby securing a boat to a dock without tying a knot.

DESCRIPTION OF THE INVENTION

In the following detailed descriptions of the rope tie, reference is made to the accompanying drawing that form a part hereof, and in which are shown, by way of illustration, specific embodiments in which the invention may be practiced. It is to be understood that other embodiments may be utilized and structure changes may be made or other method steps and sequence thereof may be used without departing from the scope of the present invention. The rope tie is herein described as used in equine and marine environment. The rope tie can have uses in other environments when tying rope around a tie site is desired.

Figure 1:
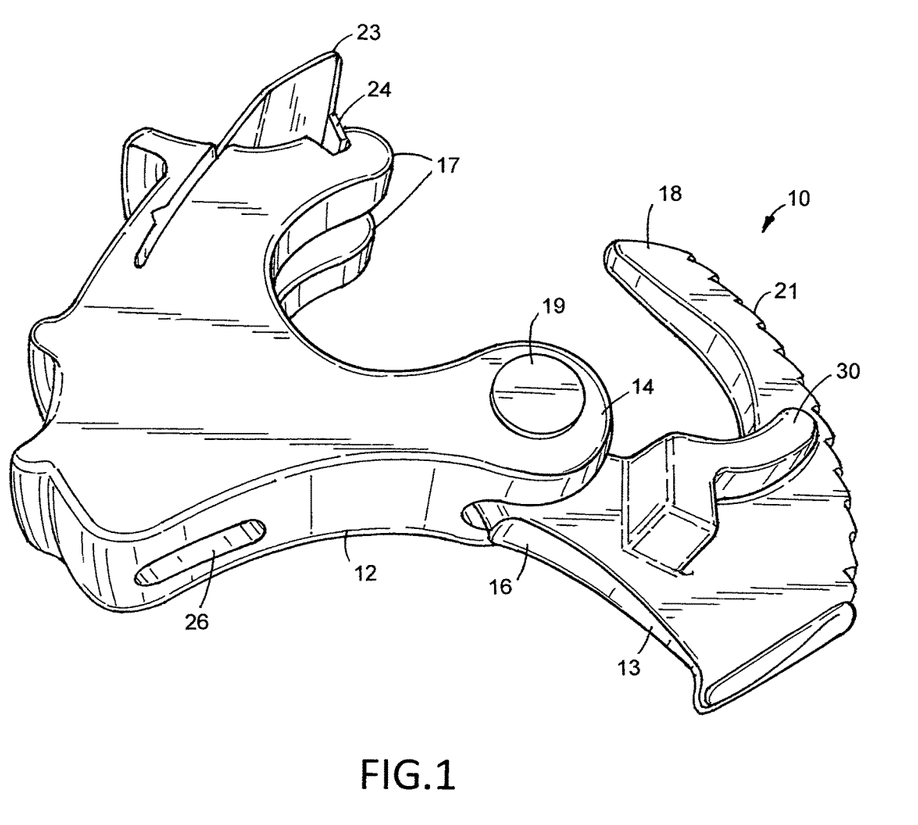
FIG. 1 is a perspective view of the rope tie of the invention with the first and second arm members in an open position.
Figure 2:
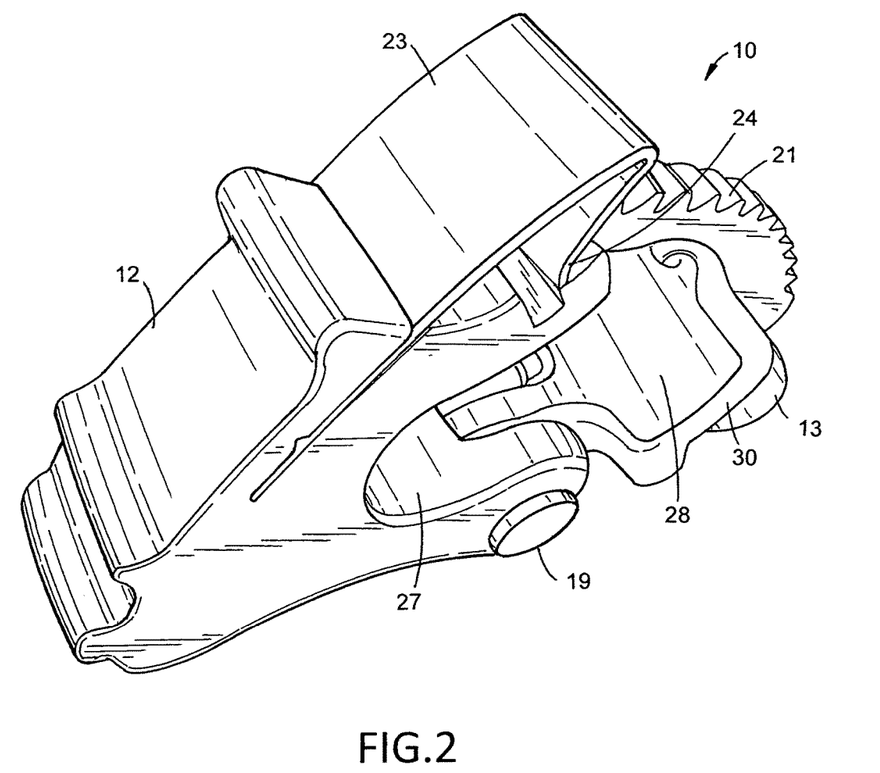
FIG. 2 is a perspective view of the rope tie of FIG. 1 showing the first and second arm members in a closed position.
Figure 3:
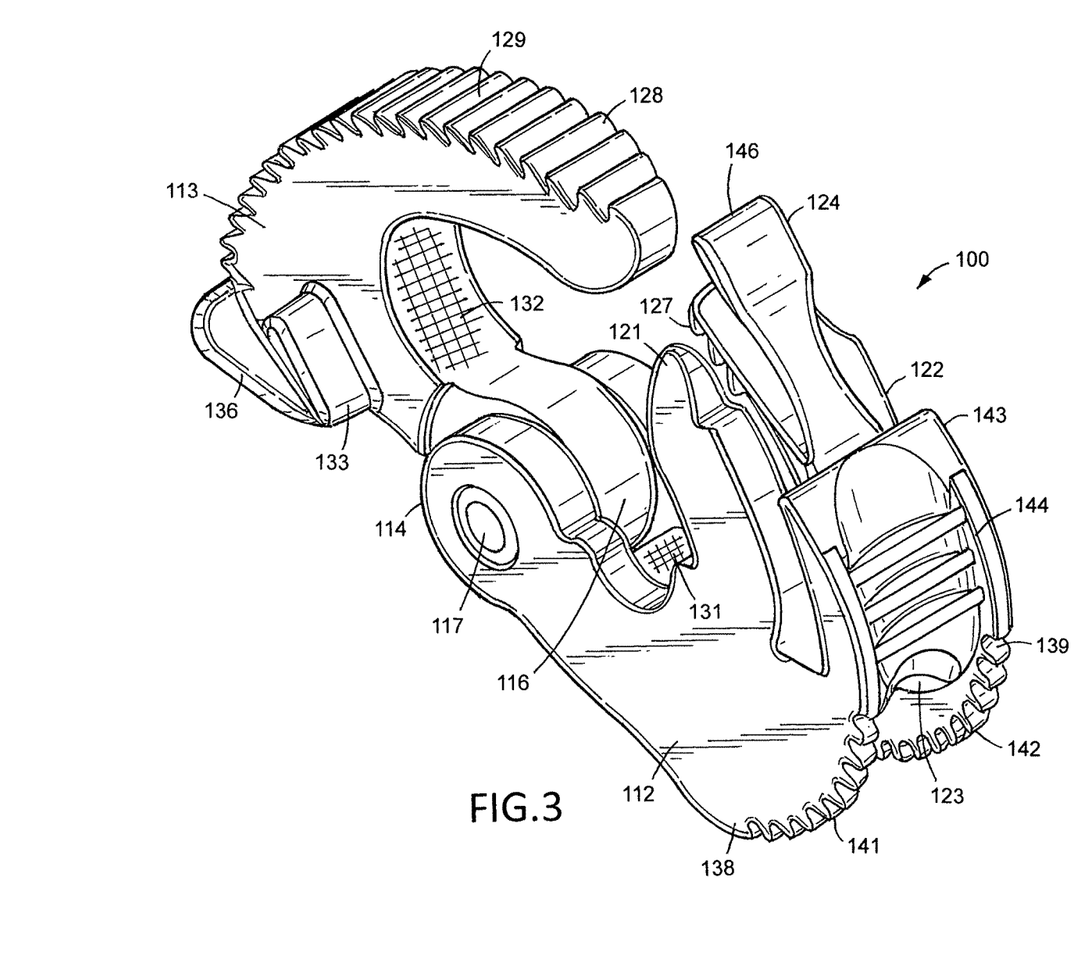
FIG. 3 is a perspective view of a modification of the tie of FIG. 1 with the first and second arm members in an open position.
Figure 4:
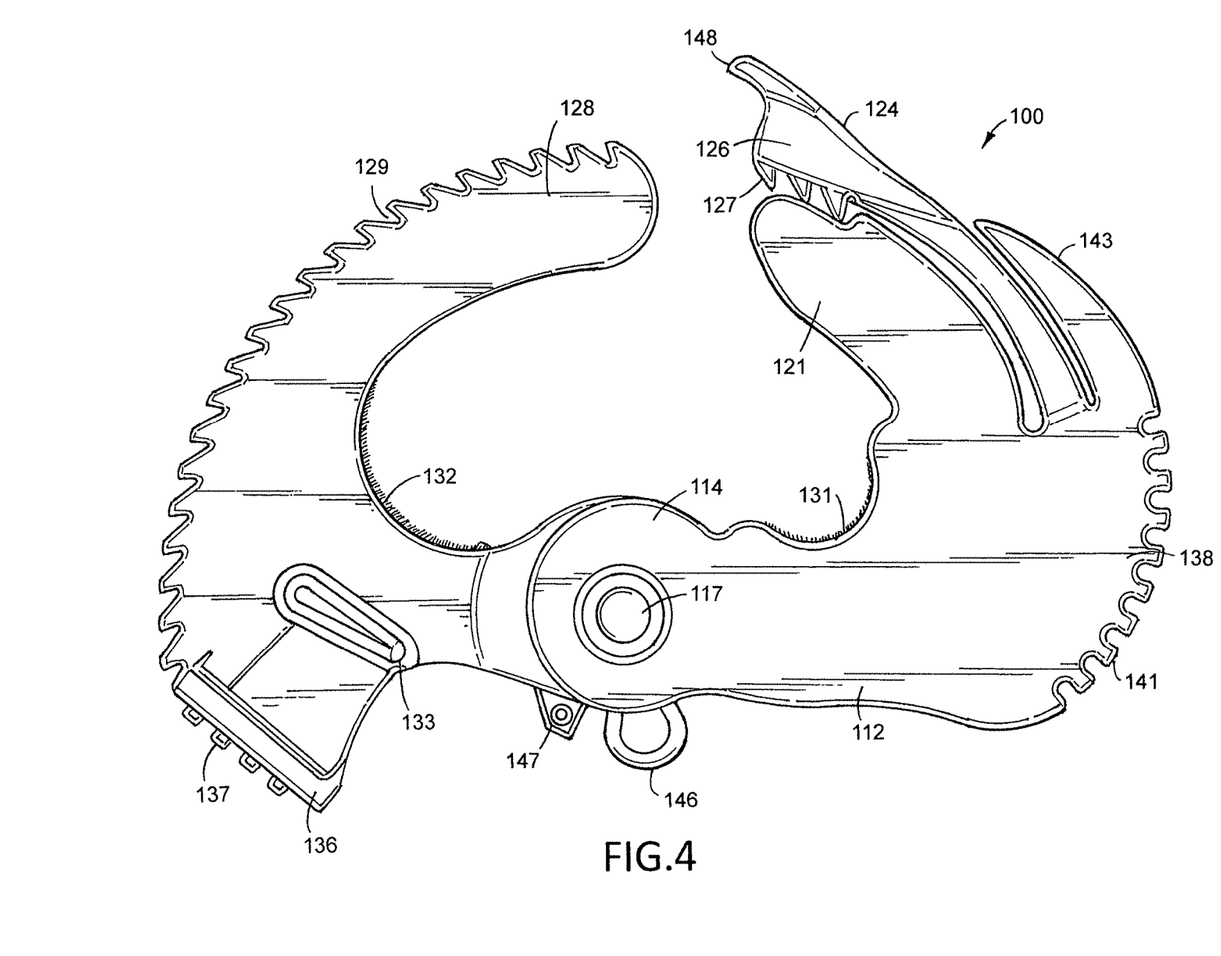
FIG. 4 is an elevated side view of the tie of FIG. 3.
Figure 5:
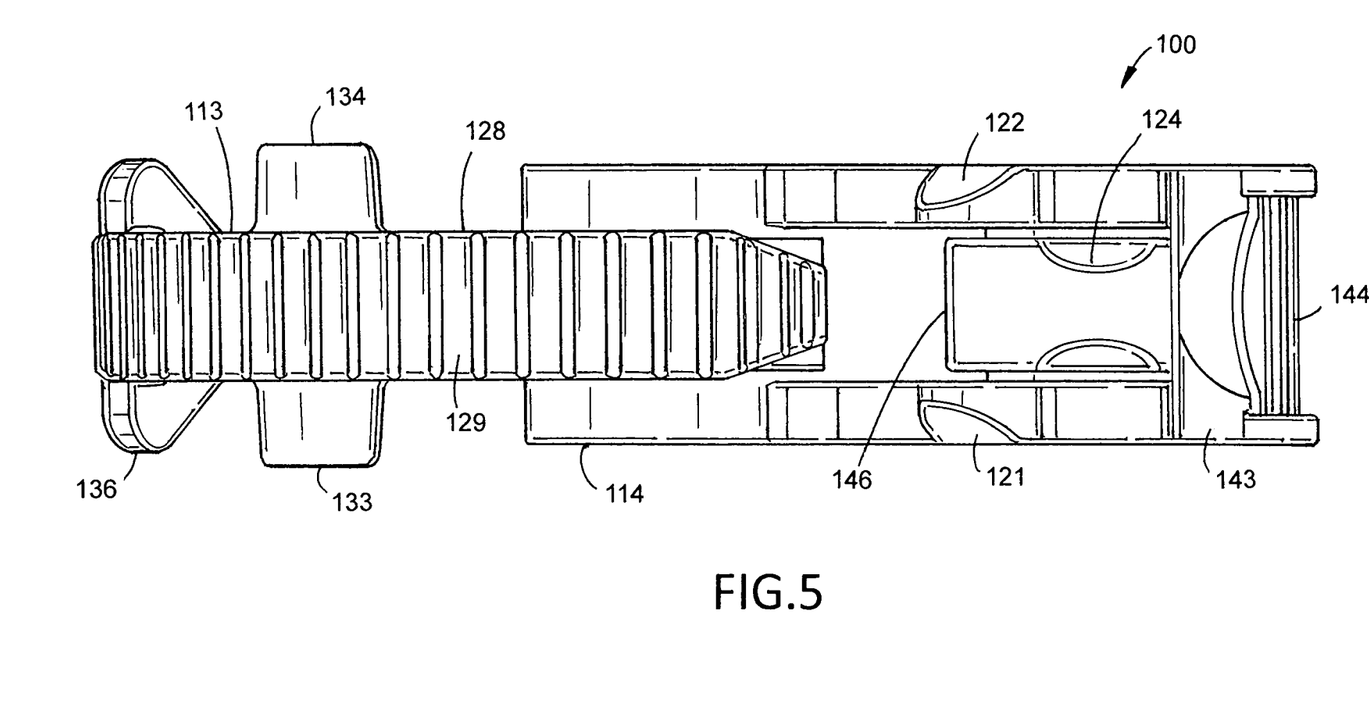
FIG. 5 is a top plan view of the tie of FIG. 3.
Figure 6:
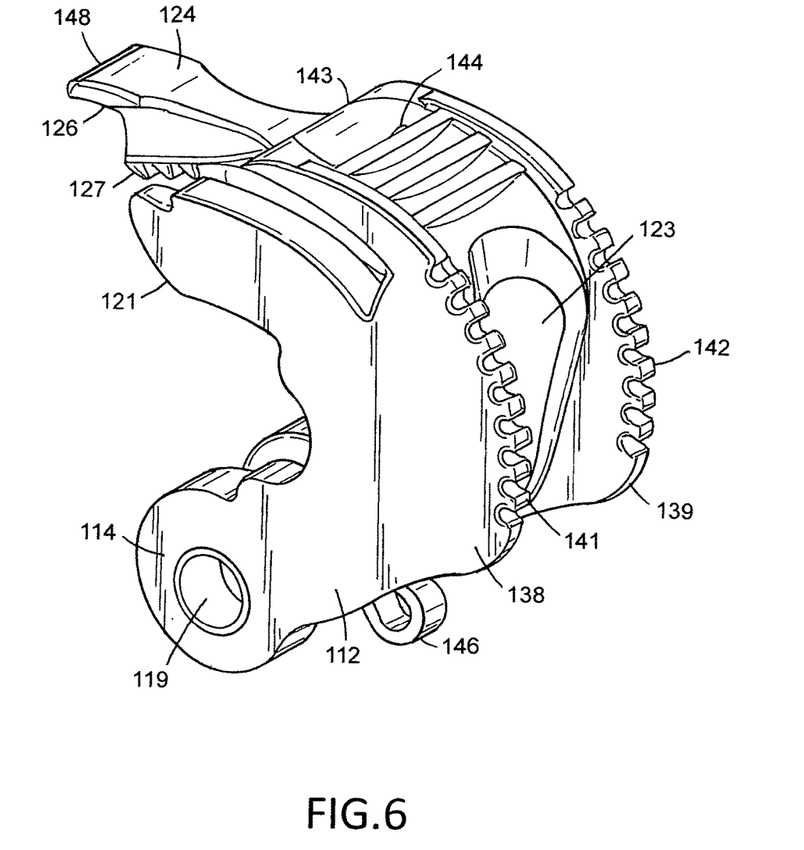
FIG. 6 is a perspective view of the first arm member disassembled from the second arm member of the tie of FIG. 3.
Figure 7:
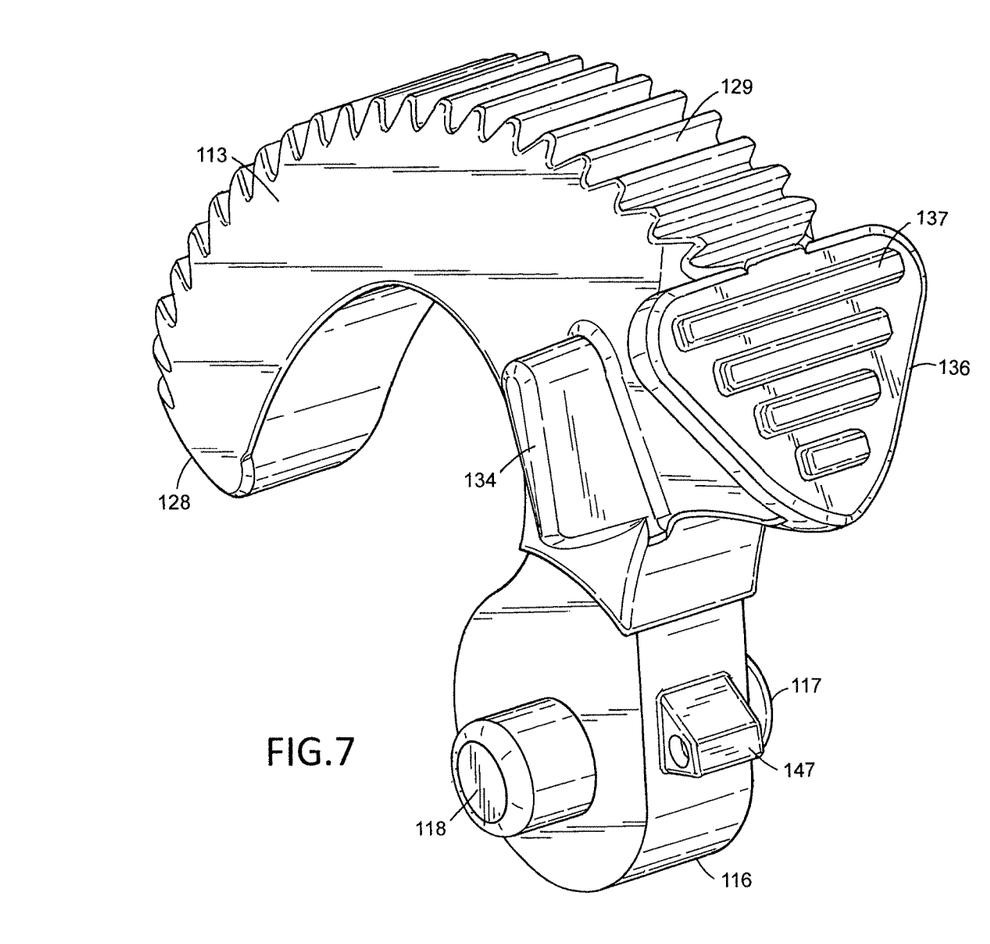
FIG. 7 is a perspective view of the second arm member disassembled from the first arm member of the tie of FIG. 3.
Figure 8:
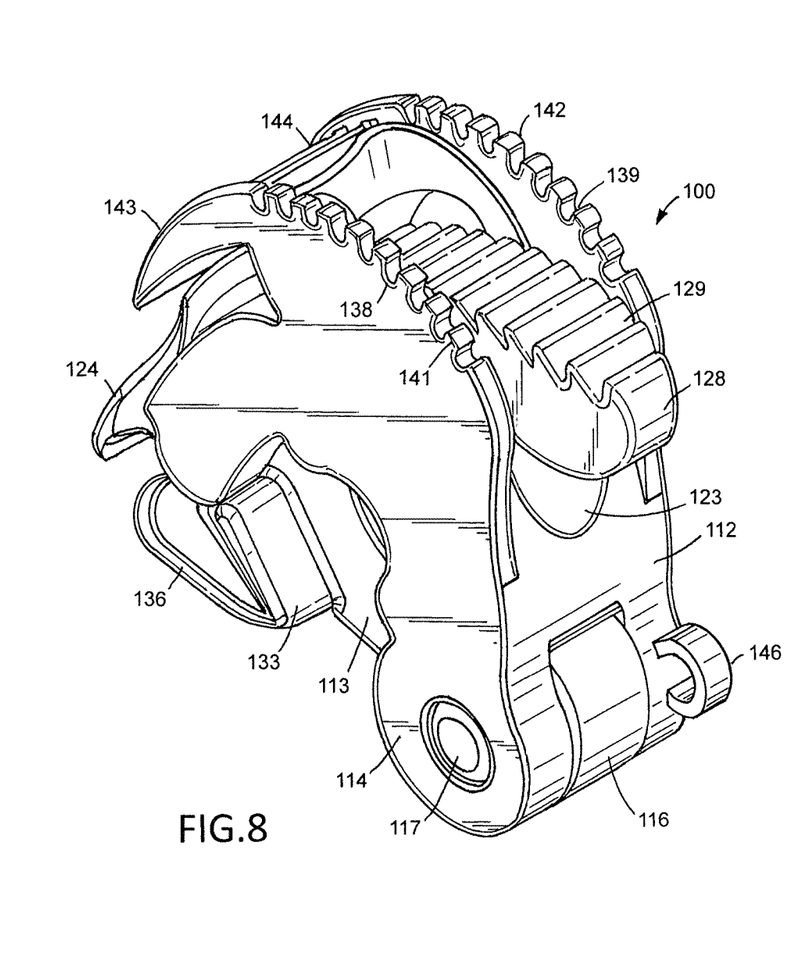
FIG. 8 is a perspective view of the tie of FIG. 3 in a closed position.

Referring to FIGS. 1 and 2, there is shown a rope tie indicated generally at 10 useable to safely tie a horse to a tie site such as a tie ring, hitching rail, post, tree, cross-tie or any other site normally used to tie a horse. Rope tie 10 is also useable as a training aid for young and old horses. Rope tie 10 accepts all sizes of ropes and rope materials, such as cotton and other materials.

Rope tie 10 has a first arm member 12 pivotally connected to a second arm member 13 whereby arm members 12 and 13 are freely movable between open and closed positions and adapted to accommodate and resistibly hold first and second portions of a rope in side-by-side relation. First arm member 12 has a forked inner end 14 accommodating a reciprocal inner end 16 of second arm member 13. Inner ends 14 and 16 of arm members 12 and 13 are pivotally connected to each other with a pivot member 19 thereby allowing substantially resistance-free movement of arm members 12 and 13 relative to one another.

The outer end of first arm member 12 has a pair of inwardly curving fork members 17 that define an opening 26. A resilient clip member 23 attached to the outer end of first arm member 12 has a resilient end member 24 that extends into opening 26. Second arm member 13 has an inwardly curved outer end 18 having a plurality of notches 21. Outer end 18 is aligned with and movable through opening 26 when first and second arm members 12 and 13 are moved together into a closed position as shown in FIG. 2. The first and second arm members 12 and 13 have complementary inner generally smooth oppositely facing surfaces 27 and 28 having substantially similar surface areas whereby equalized pressure is placed on portions of the rope being forced together with first and second arm members 12 and 13. Guide members 30 attached to opposite sides of second arm member 13 extending outwardly adjacent lower end 16 are adapted to accommodate the fingers of a user to facilitate clamping and unclamping of the rope with one hand.

To hold rope tie 10 in a closed position, end member 24 of clip member 23 is moved into a selected notch 21 in the outer end 18 of second arm member 13. End member 24 is pinched or compressed whereby end member 24 moves toward the base of clip member 23 to move end member 24 out of notch 21 and allow second arm member 13 to separate from first arm member 12 thereby allowing rope tie 10 to be opened.

In use, when tying a horse, a horse rope is positioned around a tie site such as a trailer, ring, post, tree or like sites. First and second portions of the rope are placed on the open arm members 12 and 13 of rope tie 10 in a side-by-side relation. Arm members 12 and 13 are then closed around the first and second portions of the rope. End member 24 of clip member 23 moves into a selected notch 21 to hold rope tie 10 around the first and second portions of the rope with a desired pressure. Rope tie 10 when positioned around the first and second portions of the rope creates drag or resistance to horse pull-backs on the rope when the rope is tied to a horse. The grip of rope tie 10 on the first and second portions of the rope is adjusted so that a selected effort is necessary to pull the rope through rope tie 10. If more resistance is desired, arm members 12 and 13 are moved closer together in order to close tighter around the first and second portions of the rope. End member 24 is moved into the corresponding notch 21 to maintain the tighter grip on the rope. To keep the horse tied after the horse pulls back, rope tie 10 is positioned around the first and second portions of the rope a selected distance from the loose end of the rope to allow the horse a preferred number of pull-back steps to allow movement of the rope through the rope tie 10 whereby the loose end of the rope moves toward rope tie 10 to relieve the panic of the horse and increase the safety and comfort of the horse. Rope tie 10 enables the horse to be tied to a variety of available tie sites with the degree of resistance variable. Also, force of the horse pull-back is subjected to the tie site and rope and not on rope tie 10.

A first modification of the rope tie indicated generally at 100, shown in FIGS. 3 to 8, is used to securely tie or dock a boat to a tie site such as a dock and other sites used to dock a boat. Rope tie 100 is adapted to quickly clamp boat ropes or lines tightly together thereby securing the boat to the dock without tying the lines with secure knots thereby making docking of boats quicker and easier without damage to the boat or dock.

Tie 100 has a first arm member 112 and a second arm member 113 pivotally connected to first arm member 112. First arm member 112 has an inwardly curved forked lower end 114 accommodating a reciprocal inwardly curved lower end 116 of second arm member 113. Second arm member 113 has a pair of cylindrical shaped hubs 117 and 118 that extend outwardly from lower end 116. Hubs 117 and 118 are aligned with and extend into corresponding holes 119 in forked lower end 114 of first arm member 112 to pivotally connect lower ends 114 and 116. This assembly of first and second arm members 112 and 113 allows limited resistance movement of first and second arm members 112 and 113 relative to each other and facilitates assembly of tie 100. A stop member 147 attached to lower end 116 of second arm member 113 limits the outward pivotal movement and separation of first and second arm members 112 and 113.

The upper end of first arm member 112 has a pair of inwardly curving laterally spaced fork members 121 and 122 defining a slotted opening 123 that extends through first arm member 112. First arm member 112 has a resilient lever member 124 located upwardly from fork members 121 and 122. Lever member 124 has an outer end 126 having a lower surface with a plurality of fingers 127 that extend downwardly into the top of slotted opening 123. Second arm member 113 has an inwardly curving upper end 128 adapted to be moved into slotted opening 123 when first and second arm members 112 and 113 are pivoted together. The outer surface of upper end 128 of second arm member 113 is convex curved and has a plurality of transverse notches 129. The forward portion of upper end 128 of second arm member 113 is inwardly tapered and aligned with slotted opening 123. When first and second arm members 112 and 113 are moved together upper end 128 of second arm member 113 moves into slotted opening 123 of first arm member 112 whereby lever member 124 slides up and over the convex curving outer surface of upper end 128. Fingers 127 of lever member 124 extend into notches 129 of upper end 128 which have been positioned beneath fingers 127 to prevent separation of first and second arm members 112 and 113.

Lever member 124 of first arm member 112 has an outwardly projected tab member 148 operable to move lever member 124 upwardly away from upper end 128 of the second arm member 113 to move fingers 127 out of notches 129 in upper end 128 to allow separation of first and second arm members 112 and 113. A guard member 143 attached to first arm member 112 is located above lever member 124 to limit the upward movement of lever member 124 thereby preventing lever member 124 from being inadvertently moved to an intolerable distance and broken off first arm member 112. Guard member 143 has a plurality of transverse ribs 144 to provide additional support to guard member 143.

First arm member 112 has a curved inner surface 131 having a cup shaped centrally located portion for accommodating line. Second arm member 113 has a concave curved inner surface 132 oppositely facing inner surface 131 of first arm member 112. Inner surfaces 131 and 132 of first and second arm members 112 and 113 each have a grip material or grip texture to enhance the gripping action of first and second arm members 112 and 113 when clamped on a line to tightly secure the line and prevent line slippage.

Wing shaped guide members 133 and 134 attached to opposite sides of second arm member 113 extend outwardly adjacent lower end 116 of second arm member 113. Guide members 133 and 134 are adapted to accommodate the fingers of a user to facilitate clamping and unclamping of lines with one hand.

Second arm member 113 has a triangular shaped base member 136 having an inclined outer surface provided with transverse grip members 137. Base member 136 is located adjacent the proximal end of upper end 128 of second arm member 113. Grip members 137 facilitate gripping of tie 100 by the user. Base member 136 provides a surface for applying pressure to second arm member 113 to move lever member 124 over upper end 128 and allow upper end 128 to be moved into slotted opening 123 of first arm member 112.

First arm member 112 has a pair of laterally spaced convex curved flanges 138 and 139 extending outwardly opposite fork members 121 and 122 adjacent slotted opening 123. Flanges 138 and 139 have ribbed outer edges 141 and 142 to enhance gripping of tie 100. A loop member 146 attached to lower end 114 of first arm member 112 facilitates storage of tie 100.

In use when docking a boat, a first end portion of a boat rope or line is looped around a tie site such as a dock pillar, dock cleat or like tie sites, and positioned adjacent a second interior portion of the line. Tie 100 is moved to an open position whereby upper end 128 of second arm member 113 is separated from fork members 121 and 122 of first arm member 112. First and second arm members 112 and 113 are placed around the first and second portions of the line. First and second arm members 112 and 113 are then moved together to securely clamp the first and second portions of the line and prevent slippage of the line. The line can be held in one hand and tie 100 handled with the opposite hand to clamp the line. Additional lines are secured to other tie sites in the docking area in similar manner to safely secure the boat to the dock without tying a knot. Gripping material of inner surfaces 131 and 132 of first and second arm members 112 and 113 grip the line tightly and securely to prevent slippage of the line through tie 100. Finger guide members 133 and 134 on second arm member 113 allow tie 100 to be held and clamped with one hand freeing the other hand to manipulate and retain tension on the line around the tie site. To release tie 100 from the line, tab member 148 is actuated upwardly to move lever member 124 upwardly thereby moving fingers 127 out of notches 129 allowing first and second arm members 112 and 113 to separate from each other. Guard member 143 limits upward movement of lever member 124 to prevent excessive pull back of and damage to lever member 124. Tie 100 can be suspended with loop member 146 for easier accessibility, organization and storage.

The foregoing disclosure of the invention describes and illustrates two embodiments of the rope tie of the invention. Modifications, changes in parts and arrangement of parts and materials may be made to the tie defined in the claims herein by persons skilled in the art without departing from the invention.

The invention claimed is:

1. A method of tying a rope to a fixed position comprising:
    looping a first free end portion of a rope around a tie site,
    providing a rope tie, the rope tie having a first arm member and a second arm member pivotally connected to the first arm member,
    moving the first and second arm members to an open position,
    positioning the first free end portion of the rope adjacent a second portion of the rope in side-by-side relation between the first arm member and the second arm member,
    moving the first and second arm members to a closed position to clamp onto the first and second portions of the rope whereby the first and second arm members apply equal pressure on the first and second portions of the rope allowing movement of the first and second portions of the rope through the first and second arm members with a selected resistance whereby the first fee end portion of the rope moves through the rope tie toward the tie site and the second portion of the rope moves through the rope tie in an opposite direction away from the tie site,
    releasably holding the first and second arm members in the closed position, and
    providing the second arm member with guide members adapted to accommodate fingers of a user to facilitate movement of the first and second arm members.

2. The method of claim 1 including:
    providing a resilient lever member attached to the first arm member, the lever member engagable with the second arm member to releasably hold the first and second arm members in the closed position.

3. The method of claim 1 including:
    adjusting the relative positions of the first and second arm members to allow movement of the first free end portion of the rope and the second portion of the rope in opposite directions through the first and second arm members to vary the selected resistance.

4. The method of claim 1 including:
    providing the first and second arm members with lower portions having oppositely facing gripping surfaces to grip the first and second portions of the rope to allow movement of the first free end portion of the rope and the second portion of the rope in opposite directions through the first and second arm members.

* * * * *